United States Patent [19]

Ashiba

[11] Patent Number: 4,463,839
[45] Date of Patent: Aug. 7, 1984

[54] HYDRAULIC DAMPER

[75] Inventor: Masahiro Ashiba, Kanagawa, Japan

[73] Assignee: Tokico Ltd., Kanagawa, Japan

[21] Appl. No.: 439,718

[22] Filed: Nov. 4, 1982

[30] Foreign Application Priority Data

Nov. 6, 1981 [JP] Japan .......................... 56-165530[U]
Nov. 12, 1981 [JP] Japan .......................... 56-168790[U]

[51] Int. Cl.³ .............................................. F16F 9/34
[52] U.S. Cl. .................................... 188/299; 188/318; 188/319
[58] Field of Search ............... 188/318, 319, 282, 286, 188/285, 299, 314, 315, 316, 317, 322.13, 322.15; 267/64.15–64.18; 251/205–209

[56] References Cited

U.S. PATENT DOCUMENTS 4,220,228  9/1980  Kato ..................................... 188/319
4,337,850  7/1982  Shimokura .......................... 188/319

Primary Examiner—Douglas C. Butler
Attorney, Agent, or Firm—Wenderoth, Lind & Ponack

[57] ABSTRACT

A hydraulic damper including a piston working in a cylinder and partitioning the interior thereof into two liquid chambers, a damping force generating valve device mounted on the piston to act both in extension and contraction strokes, a piston rod secured to the piston and having a coaxial bore and a radial hole to constitute a by-pass passage connecting the two liquid chambers by-passing the damping force generating valve device, a valve member provided in the by-pass passage and steppingly controlling the effective area thereof, and an actuating rod extending in the coaxial bore with the inner end being secured to the valve member. An operating mechanism is mounted on the piston rod and comprises an electromagnetic solenoid, a vertically reciprocable slide connected to the solenoid, a rotor connected to the actuating rod and having saw-teeth projections thereon, and a fixed guide cooperating with the rotor and the slide to rotate the rotor by one pitch of saw-teeth projections in response to one reciprocation of the slide.

3 Claims, 12 Drawing Figures

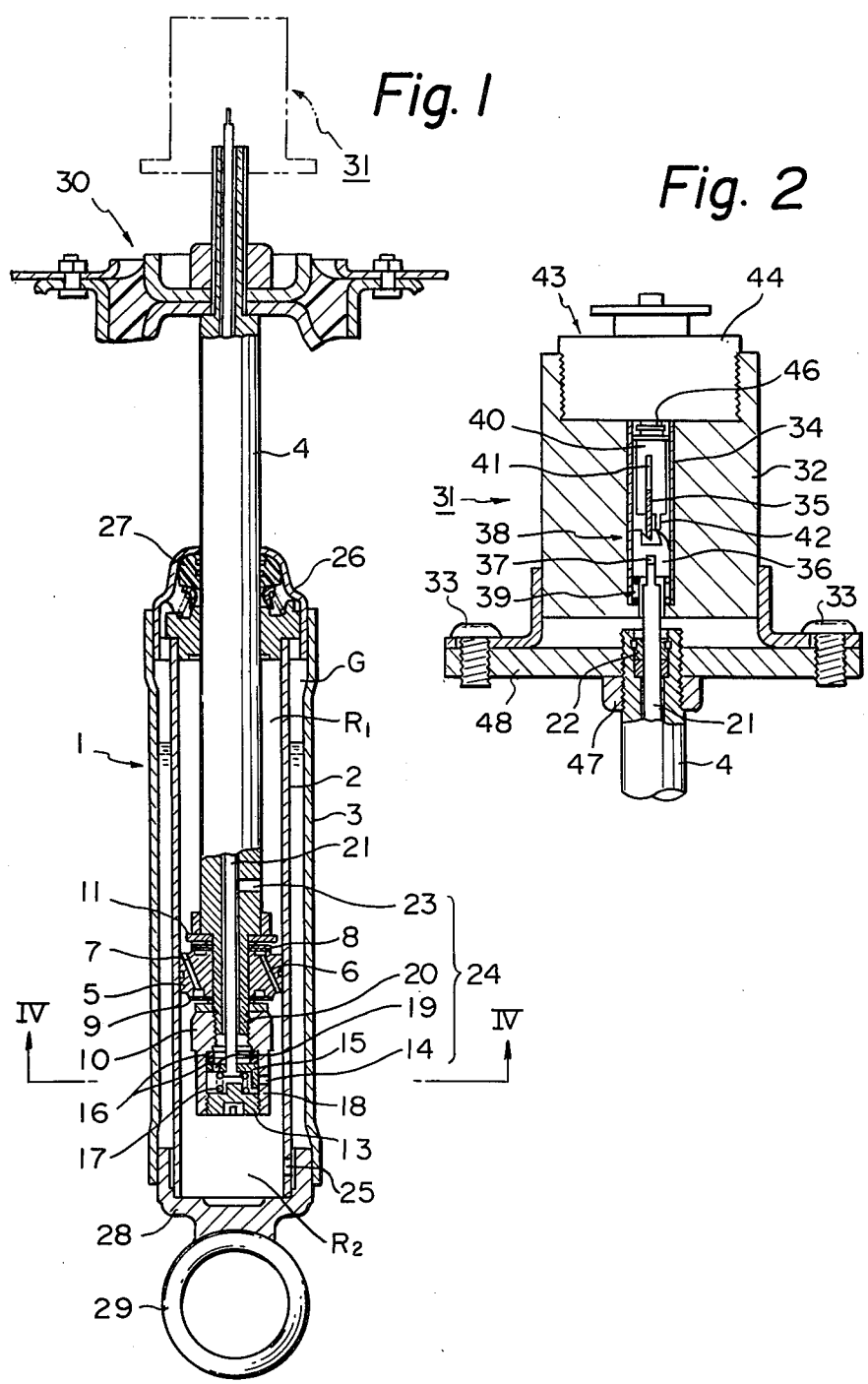

HYDRAULIC DAMPER

BACKGROUND OF THE INVENTION

This invention relates to a hydraulic damper adapted for use in a suspension system of a vehicle and, particularly to the hydraulic damper of the kind including a generally vertical cylinder receiving therein hydraulic liquid, a piston working in the cylinder and partitioning the interior thereof into two liquid chambers, one or a pair of damping force generating valves mounted on the piston for generating the damping force both in the extension and contraction strokes of the damper, a piston rod secured to the piston and extending through the upper end of the cylinder to the outside, a coaxial bore and a radial hole formed in the piston rod to constitute a by-pass passage connecting the two liquid chambers, an adjustable valve member for steppingly controlling the effective area of the by-pass passage, and an actuating rod extending through the coaxial bore in the piston rod with the inner end thereof being secured to the valve member.

The hydraulic damper of the aforementioned kind has recently proposed so as to adjust the characteristics of the damper to match with the driving condition of the vehicle such as the running speed of the vehicle and the condition of the road on which the vehicle is running. When the vehicle is running on a smooth road, the driving comfortability can be improved by decreasing the damping force of the damper and, when the vehicle is running on a rough road, it is possible to prevent excessive vertical movement or vibrations of the vehicle by utilizing stiff hydraulic dampers or by increasing the damping force of the damper. Further, it is experienced that when the vehicle is running at a high speed it is preferable to increase the damping force of the damper, otherwise, the direction of the vehicle cannot stably be maintained. The adjustable valve member can adjust the damping force by at least two distinct steps, so that the damper can be adjusted betwen the high, low and, if desired, the medium damping force conditions. The adjustment of the adjustable valve member is usually performed by rotating or axially displacing the actuating rod.

For operating the actuating rod, an electric motor or electromagnetic solenoids have been utilized. However, there are shortcomings such that, when an electric motor is utilized to operate the actuating rod, the electric motor should be accompanied with a complicated electric circuit including such as potentio-meters and the like for stopping the motor at precisely predetermined positions, and that when electromagnetic solenoids are utilized to actuate the actuating rod, the number of solenoids should correspond to the number of adjusting steps. In short, according to prior art, it is difficult to steppingly and reliably adjust the adjusting valve with a simple constitution.

SUMMARY OF THE INVENTION

An object of the invention is to prevent shortcomings aforementioned and, according to the invention, the hydraulic damper of the aforesaid kind further comprises:
- a guide member having a bore coaxial with the actuating rod being mounted on the upper end of the piston rod,
- a rotor rotatably disposed in the bore in the guide member and being normally biassed upward by a spring and associated with the actuating rod,
- saw-teeth like projections formed on the upper end of the rotor and being spaced with each other along the circumference thereof,
- at least one fixed guide projecting in the bore in the guide member for normally engaging with either one of the recesses thereby restricting the upward movement and the rotation of the rotor,
- a vertically displaceable guide guided by the fixed guide and having on the lower end thereof at least one projection for engaging with either one of the saw-teeth shaped projections on the rotor, whereby said rotor rotates by one tooth of the saw-teeth shaped projections in response to each reciprocal movement of the displaceable guide, and
- an electromagnetic solenoid connected to said displaceable guide.

The adjusting valve member may be of a rotating type wherein the actuating rod rotates around the axis thereof in steppingly adjusting the effective area of the by-pass passage, or of axially displaceable type wherein the actuating rod displaces in the axial direction in adjusting the by-pass passage. In either case, the rotor according to the invention and having the saw-teeth like projections arranged circumferentially on the upper end thereof rotates reliably by each one tooth in response to each actuation or deactuation of a single solenoid, thereby reliably adjusting the adjusting valve member by each one step.

BRIEF DESCRIPTION OF THE DRAWINGS

Further objects and advantages of the invention will become apparent from the following detailed description taken with reference to accompanying drawings exemplifying some preferred embodiments of the invention, in which:

FIG. 1 is a longitudinal sectional view of a hydraulic damper according to the invention;

FIG. 2 is an enlarged sectional view of an operating mechanism for adjusting the damper of FIG. 1;

DETAILED DESCRIPTION OF THE PREFERRED EMBODIMENT

Figure 3A:
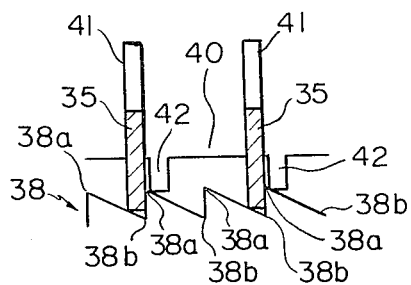
FIG. 3A and FIG. 3B are explanatory views showing the operation of the mechanism of FIG. 2.
Figure 3B:
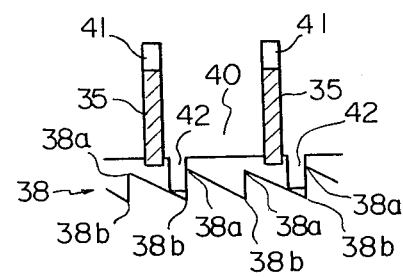

The hydraulic damper shown in FIG. 1–FIG. 4 comprises a tubular main body 1 consisting of an outer tube 3, an inner tube 2 constituting the cylinder according to the invention, and a piston 5 connected to the lower or the inner end of a piston rod 4 working in the inner tube 2 and partitioning the interior thereof into an upper chamber $R_1$ and a lower chamber $R_2$. A plurality of first and second connecting passages 6 and 7 are provided in the piston 5 (although only one of each is shown in FIG. 1) to connect the upper and lower chambers $R_1$ and $R_2$. A normally closed first damping force generating valve 8 is mounted on the upper surface of the piston 5 to cooperate with the first connecting passages 6, and a normally closed second damping force generating valve 9 is mounted on the lower surface of the piston 5 to cooperate with the second connecting passages 7.

Figure 6:
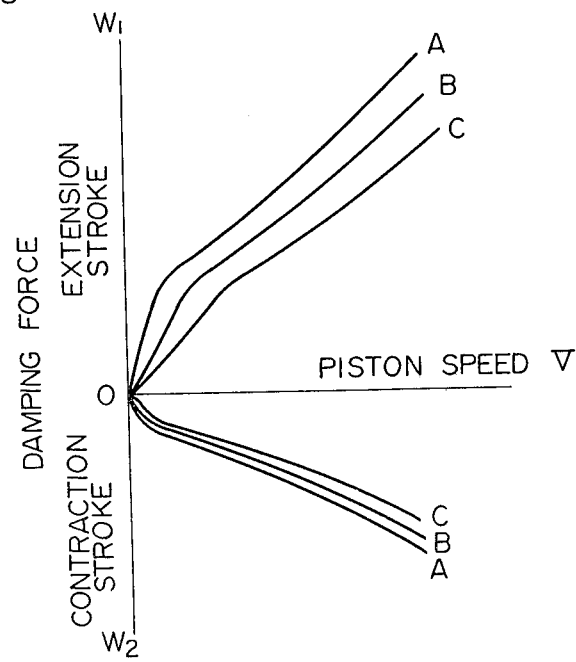
FIG. 6 is a diagram showing the damping force characteristics of the damper according to the invention.

The inner tube 2 receives therein hydraulic liquid such as oil and, in the contraction stroke or when the piston 5 moves downward as seen in FIG. 1, the first damping force generating valve 8 opens and the oil in the lower chamber $R_2$ flows through passages 6 and the valve 8 into the upper chamber $R_1$ generating a damping force. In the extension stroke, the second damping force generating valve 9 opens and the oil in the upper chamber $R_1$ flows through passages 7 and the valve 9 into the lower chamber $R_2$ and generates a damping force. The damping force at these condition is depicted by lines A in FIG. 6. It will be understood that lines A have rising up portions adjacent to the point O and these rising up portions are defined by a fixed orifice known per se and not shown in the drawings.

The piston 5 is secured to the lower end of the piston rod 4 by a hollow nut 10. The lower end of the piston rod 4 has a reduced diameter and fitted through a central bore in the piston 5, and the nut 10 is screw-threadingly secured to the reduced diameter portion of the piston rod 4. In the embodiment, the damping force generating valves 8 and 9 comprise annular valve discs, and the inner circumferences of these valve discs together with the piston 5 are secured to the piston rod 4 by the nut 10.

The lower end of the nut 10 is closed by a cap 13 whereby a hollow space is defined in the nut 10. Two communicating holes 14a and 14b (FIG. 4) are formed in the peripheral wall of the nut 10, and are spaced circumferentially by an arcuate angle of 90 degrees. A valve member 15 is rotatably and slidably engaging with a generally cylindrical inner surface of the nut 10, and the valve member 15 is biased upward against a washer 16 by a spring 17 which extends between the valve member 15 and the cap 13. Further, the valve member 15 integrally has an arcuate wall portion 18 extending downwardly and circumferentially along an arcuate angle of about 180 degrees so as to selectively and steppingly open or close the connecting holes 14a and 14b. The valve member 15 further has four vertical openings 19 equally spaced with each other along the circumference thereof to permanently communicate the space lower side of the valve member 15 with the space upper side thereof.

A coaxial bore 20 extends through the piston rod 4, and an actuating rod 21 rotatably extends through the bore 20 with the lower end thereof being secured to the valve member 15. The upper end of the rod 21 sealingly extends through the bore 20 to the outside. Shown at 22 is a seal. A radial hole 23 is formed in the piston rod 14 to connect the interior of the bore 20 with the upper chamber $R_1$. Thus, a by-pass passage 24 is defined by the radial hole 23, the bore 20, the vertical openings 19, the interior of the nut 10, and connecting holes 14a and 14b for connecting the upper and lower chambers $R_1$ and $R_2$ by-passing the damping force generating valves 8 and 9 on the piston 5. When the valve member 15 takes the condition shown in FIG. 4, the connecting holes 14a and 14b are closed by the valve member 15 and, accordingly, the by-pass passage 24 is closed. The damping force characteristics of the damper are defined by lines A in FIG. 6.

Figure 4:
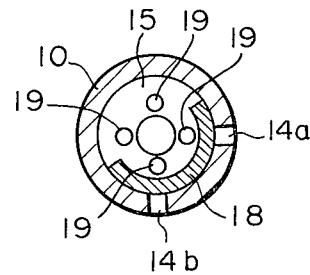
FIG. 4 is a sectional view taken along the line IV—IV in FIG. 1.

When the valve member 15 is rotated by 90 degrees in counterclockwise direction as viewed in FIG. 4, one of the connecting holes 14b opens, and the by-pass passage 24 is established with the effective area of which is determined by the sectional area of the connecting hole 14b. The communication of the oil between the chambers $R_1$ and $R_2$ is easy as compared with the valve closed condition, thus, the damping force decreases and the characteristic thereof are depicted by such as lines B in FIG. 6.

When the valve member 15 is further rotated in the counterclockwise direction as viewed in FIG. 4 by 90 degrees two connecting holes 14b and 14a open, then, the effective area of the by-pass passage 24 further increases. Thus, the damping force of the damper in response to the contraction and extension strokes of the damper further decreases, and are depicted by such as lines C in FIG. 6.

When the valve member 15 is further rotated by 90 degrees in the counterclockwise direction in FIG. 4, the connecting hole 14b closes and the effective area of the by-pass passage is determined by the connecting hole 14a. The characteristics of the damping force is similar to the aforesaid condition wherein the connecting hole 14a is closed and the connecting hole 14b is open.

When the valve member 15 is further rotated by 90 degrees in the counterclockwise direction, the valve member 15 takes the condition shown in FIG. 4.

Thus, according to the embodiment, the valve member is rotated by four steps, and the adjustment of the damping force is effected by three steps.

In the embodiment, the inner and outer tubes 2 and 3 define therebetween an annular space acting as a reservoir chamber which contains gas G in the upper portion and oil in the lower portion. The oil in the reservoir chamber permanently communicates with the lower chamber $R_2$ through an opening 25 formed in the inner tube 2. The pressure of the gas G acts on the oil in chambers $R_2$ and $R_1$ to assure desired operation of the damper, and also acts on a seal 27 which sealingly engages with the inner surface of a cap 26 closing the upper end of the outer tube 3. The lower end of the outer tube 3 is closed by a cap 28 having a mounting ring 29. The mounting ring 29 is mounted on an unsprung mass of a vehicle such as a wheel shaft, and the upper end of the piston rod is mounted on a sprung mass of a vehicle such as the chasis 30 (only a portion of which is shown in FIG. 1) of an automobile.

An operating mechanism 31 is mounted on the upper end of the piston rod 4 to rotatingly operate the actuating rod 21, and the mechanism 31 will hereinafter be explained.

The mechanism 31 comprises a base plate 48 screw-threadingly engaging with the upper end of the piston rod 4 and secured thereto by a nut 47, a housing 32 mounted on the base plate 48 by screws 33, a cylindrical guide 34 mounted in a central bore in the housing 32 and rotatably receiving therein the upper end of the atuating rod 21, a rotor 36 rotatably received in the guide 34 and non-rotatably connected to the upper end of the actuating rod 21, a coil spring 39 received in the guide 34 and biasing upward the rotor 36, a slide 40 vertically displaceably and non-rotatably received in the guide 34 and upper side of the rotor 36, and an electromagnetic solenoid 43 actuating a plunger 46 in the vertical direction in response to the energization or the deenergization of the solenoid 43.

For guiding the slide 40 vertically displaceably and non-rotatably in the guide 34, there are provided two fixed guides 35 projecting on the inner surface of the guide 34. The fixed guides 35 are spaced from each other in the circumferential direction and, preferably, by an arcuate angle of 180 degrees, and vertically extending grooves 41 are formed in the slide 40 to engage with fixed guides 35 respectively.

The rotor 36 is non-rotatably but vertically displaceably connected to the upper end of the actuating rod 21. In the embodiment, a vertical groove or recess 37 is formed in the lower surface of the rotor 36 to vertically displaceably receive therein a generally plate like shaped upper end of the actuating rod 21.

On the upper circumferential portion of the rotor 36 there are provided saw-teeth like projections 38 extending in the circumferentially and being uniformly spaced with each other. As shown in FIG. 3A, the projections 38 consist of four projecting portions 38a and four recess portions 38b, with the right side of each projecting portions 38 being defined by an inclined surface and the left side thereof by a vertical surface, thereby making a saw-tooth like configuration. The spring 39 acting on the rotor 36 normally maintains the rotor 36 in the condition shown in FIG. 3A wherein two recess portions 38b engage respectively with the lower ends of fixed guides 35.

The slide 40 has on the lower surface thereof two vertical projections 42 which are spaced each other by 180 degrees in the circumferential direction and are located respectively adjacent to and right sides of respective fixed guides 35 or grooves 41 as shown in FIG. 3A. Each projections 42 in FIG. 3A engages with inclined surface on the right side of corresponding projecting portion 38a of saw-teeth like projections 38.

The mechanism 31 operates as follows. Normally, the solenoid 43 is deenergized and the plunger 46 thereof takes an upper position. The slide 40 takes an upper position. It will be understood that the slide 40 is positively connected to the plunger 46 and, in the non-actuated condition shown in FIG. 3A, a small clearance (not shown) is formed between the lower end of each projection 42 and the saw-teeth like projections 38. The rotor 36 is biased upward by the spring 39 and is rotated by the engagement between the inclined surfaces of projecting portions 38a with the lower ends of fixed guide 35 until the fixed guides 35 engage with recess portions 38b. Thus, the actuating rod 21 takes a predetermined angular position and is prevented from incidental rotation thereof.

When the solenoid 43 is energized, the slide 40 is moved downward, with the projections 42 pushing downward the rotor 36. The projections 42 engage with the inclined surfaces of saw-teeth like projections 38 thereby rotating the rotor 36. In comparing FIGS. 3A and 3B, it will be understood that the rotor (the saw-teeth projections 38) has moved downward and leftward as viewed in FIG. 3B as compared with FIG. 3A. Thereafter, the solenoid 43 is deenergized with the slide 40 moving upward and separating from the rotor 36. The rotor 36 also moves upward by the spring 39 and, firstly, the inclined surfaces of two projecting portions 38A engage with the lower ends of respective fixed guides 35, and the rotor 36 rotates (in the leftward direction as viewed in FIG. 3B), until respective fixed guides 35 engage with two of recess portion 38b as seen in FIG. 3A. The rotor 36 has been rotated by 90 degrees as compared with the initial condition.

As described heretofore, the rotor 36 rotates by 90 degrees in response to each cycle of energization and deenergization of the solenoid 43, thus, it is possible to steppingly rotate the actuating rod by 90 degrees reliably, and the actuating rod 21 is reliably retained at each rotated position. The valve member 15 rotates as heretofore described and the damping force is adjusted to either one of the three steps.

Figure 5:
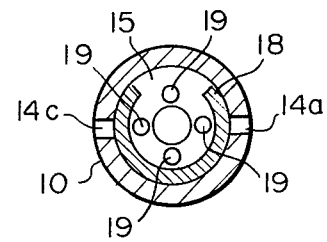
FIG. 5 is a view similar to FIG. 4 but showing a modified form.

FIG. 5 shows a modified form wherein the connecting hole 14b in FIG. 4 is substituted by a connecting hole 14c which is located diametrically opposite to the connecting hole 14a. The arcuate wall 18 of the valve member 15 in the embodiment of FIG. 5 extends along the arcuate angle of about 270 degrees. In rotating the valve member 15 by each step of 90 degrees, it is possible to selectively obtain two conditions, i.e. either one of two connecting holes 14a or 14c is open, and both of connecting holes 14a and 14c are closed. The damping force can be adjusted at two steps by rotating the actuating rod in four steps.

Figure 7:
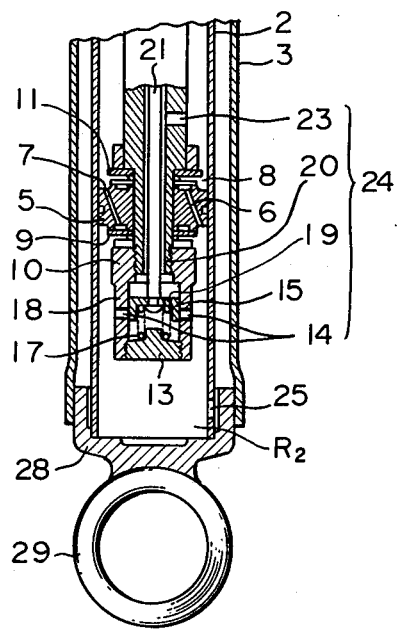
FIG. 7 is a partially omitted sectional view according to second embodiment of the invention.

FIG. 7-FIG. 9C show a second embodiment of the invention. The hydraulic damper shown in FIG. 7 is generally similar to FIG. 1 and the same reference numerals are applied to corresponding parts.

FIG. 7 differs from FIG. 1 in that the valve member 15 secured to the inner end of the actuating rod 21 displaces in the vertical direction in opening or closing the by-pass passage. Namely, the washers 16 in FIG. 1 are omitted. Further, the valve member 15 in FIG. 1 adjust the effective area of the by-pass passage between two steps, i.e., the fully closed condition and the fully open condition whereat the two connecting holes 14 are fully open.

Figure 8:
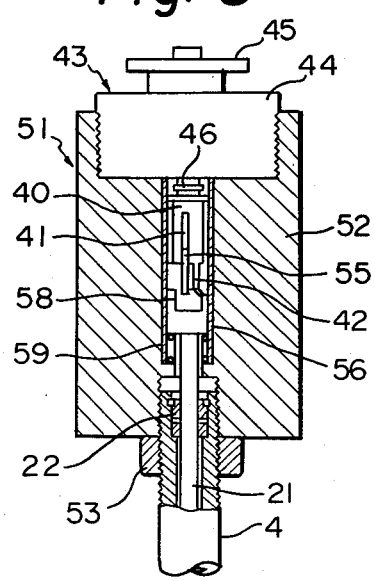
FIG. 8 is a sectional view showing the operating mechanism mounted on the hydraulic damper of FIG. 7.
Figure 9A:
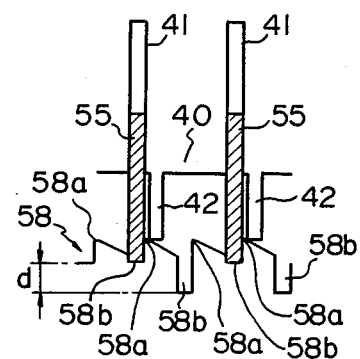
FIG. 9A, FIG. 9B and FIG. 9C are explanatory views showing the operation of the mechanism of FIG. 8.
Figure 9B:
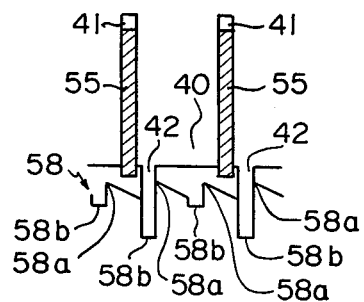
Figure 9C:
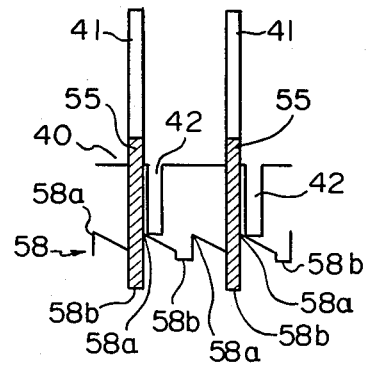

The actuating rod 21 of FIG. 7 is operated by an operating mechanism 51 shown in FIG. 8. Similarly to the mechanism 31 shown in FIG. 2, the mechanism 51 essentially consists of a housing 52 screw-threadingly secured to the upper end of the piston rod 4 by a nut 53, an electromagnetic solenoid 43 mounted on the upper end of the housing 52, a cylindrical guide mounted in a coaxial bore in the housing 52, a slide 40 slidably and non-rotatably mounted in the cylindrical guide and having grooves 41 and projections 42, two fixed guides 55 partially engaging with respective grooves 41 in the slide 40, a rotor 56 rotatably disposed in the cylindrical guide and lower side of the slide 40, and a spring 59 biasing the rotor 56 in the upward direction. Similar to the first embodiment, there are provide on the upper circumferential edge of the rotor 56 four sets of saw teeth like projections 58 each consisting of a projection 58a defined by a vertical surface and an inclined surface and a recess 58b defined between the vertical surface of a projection 58a and the bottom of adjacent projection 58a. Different from the first embodiment, the depth of the recess 58b change alternately to form two deep recesses and two shallow recesses. When the lower ends of fixed guides 55 engage respectively two shallow recesses 58b as shown in FIG. 9A the rotor 56 is located at a lower position, and when the lower ends of the fixed guides 55 engage with two deep recesses 58b as shown in FIG. 9C the rotor 56 takes an upper position. The rotor 56 and the actuating rod 21 are rigidly connected in the embodiment. In response to energization and deenergization of the solenoid 43 which, similarly to the first embodiment, makes one cycle of downward and upward movement of the slide 40, thereby rotating the rotor 56 by 90 degrees. Thus, the valve member 15 alternately takes the lower position (closed condition) and the upper position (open condition). The rotor 56 and the actuating rod may rotatably connected by a suitable coupling so that the valve member 15 simply move upward and downward without accompanying the rotation, whereby the resistance of the rotation of the rotor 56 can be reduced.

The damping force in the embodiment of FIG. 7 is adjusted in two steps, but, the embodiment can easily be modified to effect the adjustment in three or more steps. For example, the vertical positions of two connecting holes 14 are changed with each other, and by positioning the valve member 15 at three vertical positions, the damping force can be adjusted at three steps. The rotor 56 is modified to have six or three sets of saw-teeth like projections defining recesses having three different depths.

The invention is not limited to the embodiments described. For example, the valve member 15 may be located in the coaxial bore 20 in the piston rod to selectively open or close the radial bore 23 in FIG. 1, at that case, the radial bore 23 preferably consists of two or more small holes. The hollow nut 10 may simply be a usual nut having female screw-threads extending therethrough.

The electromagnetic solenoid 43 can be operated by any suitable electric circuit, and the actuating switch therefor is preferably mounted at a location accessible by the driver of the vehicle.

Further, in the embodiments, two damping force generating disc valves are mounting on opposite surfaces of the piston to generate the damping force both in the extension and contraction strokes of the damper, but the invention may be applied to other types of the damper provided that the damping force in the extension and contraction strokes of the damper is generated by one or more valves mounted on the piston.

As described heretofore, according to the invention, the damping force of the damper can be adjusted at a plurality of steps by a simple mechanism.

What is claimed is:

1. A hydraulic damper including a generally vertical cylinder receiving therein hydraulic liquid, a piston working in the cylinder and partitioning the interior thereof into two liquid chambers, one or a pair of damping force generating valves mounted on the piston for generating the damping force both in the extension and contraction strokes of the damper, a piston rod secured to the piston and extending through the upper end of the cylinder to the outside, a coaxial bore and a radial hole formed in the piston rod to constitute a by-pass passage connecting said two liquid chambers, an adjustable valve member for steppingly controlling the effective area of the by-pass passage, and an actuating rod extending through said coaxial bore in the piston rod with the inner end thereof being secured to said valve member, characterized by a guide member having a bore coaxial with the actuating rod and being mounted on the upper end of the piston rod, a rotor rotatably disposed in said bore in the guide member and being normally biassed upward by a spring and associated with the actuating rod, saw-teeth like projections and recesses formed on the upper end of the rotor and being spaced with each other along the circumference thereof, at least one fixed guide projecting in said bore in the guide member for normally engaging with either one of the recesses thereby restricting the upward movement and the rotation of said rotor, a vertically displaceable guide guided by said fixed guide and having on the lower end thereof at lease one projection for engaging with either one of said saw-teeth shaped projections on the rotor, whereby said rotor rotates by one tooth of said saw-teeth shaped projections in response to each reciprocal movement of said displaceable guide, and an electromagnetic solenoid connected to said displaceable guide.

2. A hydraulic damper according to claim 1 wherein said adjustable valve member is rotatable around the axis of said actuating rod with an arcuate outer circumference thereof cooperating with the inner circumference of a hollow nut which is disposed in the lower liquid chamber and connects the lower end of the piston rod with the piston, a plurality of radial holes are formed in said hollow nut which permanently open to the lower liquid chamber and are selectively closed in response to the rotation of said valve member, and the upper end of the actuating rod is non-rotatably but vertically displaceably connected to said rotor.

3. A hydraulic damper according to claim 1 wherein said adjustable valve member is verically slidably engaging with the inner circumference of a hollow nut which is disposed in the lower liquid chamber and connects the lower end of the piston rod with the piston, a plurality of radial holes are formed in said hollow nut which permanently open to the lower liquid chamber and are selectively closed in response to the vertical sliding movement of said valve member, a spring acts on the valve member for biasing the same in the upward direction, the upper end of said actuating rod abuts relatively rotatably with said rotor, a plurality of recesses having different axial depth are defined in said saw-teeth like projections for selectively engaging with said fixed guide thereby controlling the axial location of said rotor and, accordingly of said valve member in response to the rotational position of said rotor.

* * * * *